United States Patent [19]

Heckethorn

[11] 3,955,250
[45] May 11, 1976

[54] U-BOLT CLAMP SADDLE

[75] Inventor: John E. Heckethorn, Dyersburg, Tenn.

[73] Assignee: Heckethorn Manufacturing Co., Dyersburg, Tenn.

[22] Filed: Nov. 19, 1974

[21] Appl. No.: 525,225

[52] U.S. Cl. .................................. 24/277; 24/278
[51] Int. Cl.² ....................................... B65D 63/00
[58] Field of Search ................................... 24/277

[56] References Cited
UNITED STATES PATENTS

| 2,908,470 | 10/1959 | Garman | 24/278 X |
|---|---|---|---|
| 3,192,593 | 7/1965 | Osborn et al. | 24/277 |
| 3,772,745 | 11/1973 | Dowling | 24/277 |

Primary Examiner—Paul R. Gilliam
Assistant Examiner—Victor N. Sakran
Attorney, Agent, or Firm—Dennison, Dennison, Meserole & Pollack

[57] ABSTRACT

A saddle for a U-bolt clamp is constituted of a pair of tubular housings arranged to receive and slide axially upon the legs of a U-bolt having a semicircular bight, with the housings connected by a web portion consisting of a pair of parallel planar sections of sheet steel welded together in full face contact and extending transversely between the housings integral therewith. The upper (bight facing) edge of each planar section is curved as a semicircular recess curved on the radius of the U-bolt bight. The lower portion of each planar web section is, for the major portion of its length between the tubular housings, doubled back upon itself in flat face contact with the outer face of its associated planar web section, thus providing a double thickness for each web section throughout the area covered by the double back portion and materially reinforcing the entire web portion of the saddle both horizontally and vertically with four thicknesses of the sheet steel from which the saddle is made. The upper edge of the doubled back reinforcement is spaced distally below the bottom of the semicircular recess of its associated web section and is formed with an outturned lateral flange over its full length, which flange lies in a plane normal to the longitudinal axes of the tubular housings and additionally reinforces its web section against horizontal distortion when securing nuts threaded on the ends of the U-bolt legs are drawn up against the lower end faces of the tubular housings to tighten the clamp.

3 Claims, 10 Drawing Figures

U-BOLT CLAMP SADDLE

CROSS REFERENCE

This application is directed to an invention related to the subject invention of U.S. Pat. No. 3,772,745.

BACKGROUND

The field of the present invention is the art of U-bolt saddle clamps employed for example in the exhaust systems of automotive vehicles powered by internal combustion engines.

The prior art directly concerned with such clamps is for the most part derived from a basic assembly comprising a U-bolt having a semicircular bight portion integrally connecting a pair of parallel legs which mount in axially slidable relation a sheet steel saddle member including tubular portions receiving and housing the bolt legs and connected by a central web extending transversely between the tubular housings integral therewith. The saddle has a work engaging edge facing and curved on the radius of the U-bolt bight. The free end portions of the bolt legs are threaded for reception of securing nuts that are drawn up against lock washers interposed between the nuts and adjacent ends of the tubular housings to advance the saddle and clamp together a coupling of telescoped cylindrical tubes disposed between the bight of the U-bolt and the curved edge of the saddle member.

Typical examples of prior art clamp structures most closely approaching the present invention are U.S. Pat. No. 2,719,345 to W. F. Riker and U.S. Pat. No. 3,137,053 to N. J. Osborn et al. Clamps of the types illustrated in these patents and in aforesaid U.S. Pat. No. 3,772,745 to William E. Dowling et al. have saddles formed from initially planar oblong blanks of relatively thin sheet steel. These are cut, stamped, and rolled or otherwise formed to provide a central web integrally connecting a pair of tubular portions arranged to slide axially on the legs of an associated U-bolt. In some cases the saddle web is only a single sheet; in others the web is constituted of a pair of identical sheets joined in parallel in full face contact relation or in laterally spaced relation with or without an identical intermediate spacer sheet.

In all cases the work engaging edge of the saddle web is required to impart sufficient clamping pressure to indent a semicircular bead in both the inner and outer sections of a telescoped tubular conduit coupling to which the clamp is applied. The applied clamping pressure is a function of torque level to which the securing nuts are finally tightened when they are drawn up on the threaded ends of the U-bolt legs. So far as I am aware, in clamps of the foregoing general types, the saddle webs which have no longitudinal reinforcement usually start to twist laterally and roll over when tightened to torque levels in the vicinity of 16 foot lbs. Clamp saddles longitudinally reinforced in the manner disclosed in aforesaid Dowling et al U.S. Pat. No. 3,772,745 successfully resist such twisting and rolling at much higher torque levels, such as 40 foot lbs. However, in the present stage of the automotive industry, there is an increasing demand for clamps having a much greater clamping ability, especially those designed to meet certain critical requirements in connection with anti-pollution catalytic devices on new vehicles, which must withstand torque levels of 50 foot lbs. and higher.

SUMMARY OF THE INVENTION

U-bolt clamps equipped with saddles made in accordance with the present invention will successfully withstand a torque level of 80 foot lbs. This increase in heavy clamping ability provides plenty of reserve strength to meet conditions of service that may require clamping ability heavier than that normally required in contemporary heavy duty installations. Clamp saddles of the present invention are formed of at least four thicknesses of low carbon, high strength sheet steel in the web area with added longitudinal reinforcement of a character that is novel in the art.

DETAILED DESCRIPTION

Figure 1:
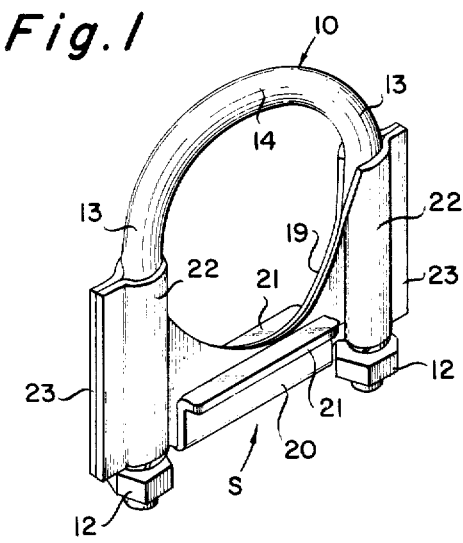
FIG. 1 is a perspective view of a perferred form of the present invention as service-assembled with a U-bolt.
Figure 2:
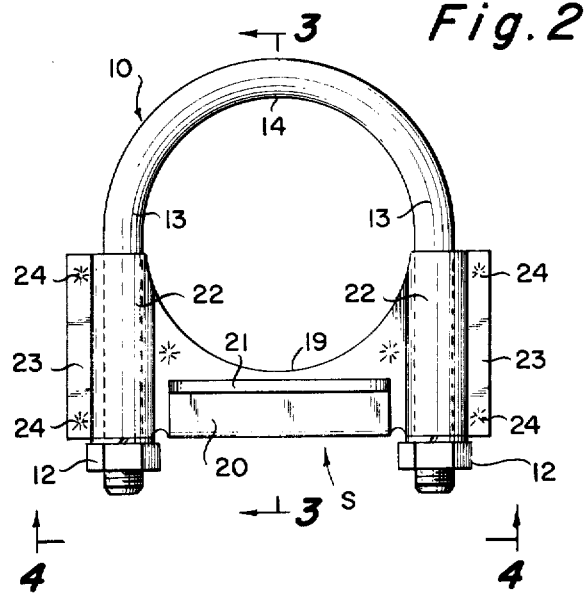
FIG. 2 is a side elevation thereof.

In both forms of the invention a complete clamp assembly comprises a U-bolt 10 mounting a saddle S and a pair of securing nuts 12 with lock washers between the bottom edge of the saddle body and the securing nuts. The nuts are threaded on the free end portions of the legs 13 of the bolt. These legs extend in parallel relation from the semicircular bight portion 14 of the U-bolt. The saddle is slidable axially on the bolt legs.

The invention instrinsic in the specific embodiments herein disclosed resides in the structure and arrangement of the clamp saddle member itself. The saddles are formed from initally planar, thin, oblong sheet steel blanks of low carbon high strength 13 gage (0.089″) steel with a minimum tensile strength in excess of 50/Mlbs. This steel can be severely formed in the saddle web area and welds beautifully; it provides considerable extra strength with ease of stamping, forming and welding. The saddle member of the preferred embodiment is constituted of two such blanks welded together as an integral body unit; the saddle member of the alternative embodiment is constituted of a single blank doubled upon itself.

Figure 3:
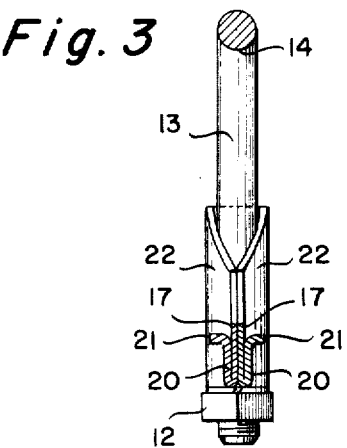
FIG. 3 is a sectional view on the line 3—3 of FIG. 2.
Figure 4:
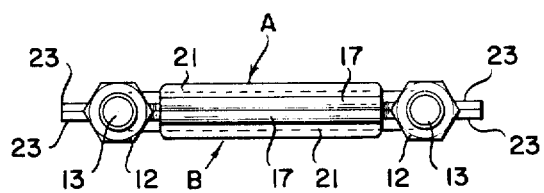
FIG. 4 is a bottom plan view from line 4—4 of FIG. 2.
Figure 5:
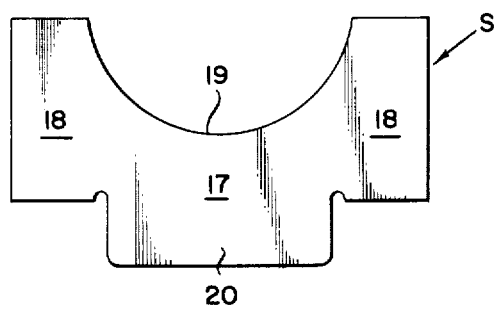
FIG. 5 is a plan view of the blank from which the saddle of FIG. 2 is formed.
Figure 6:
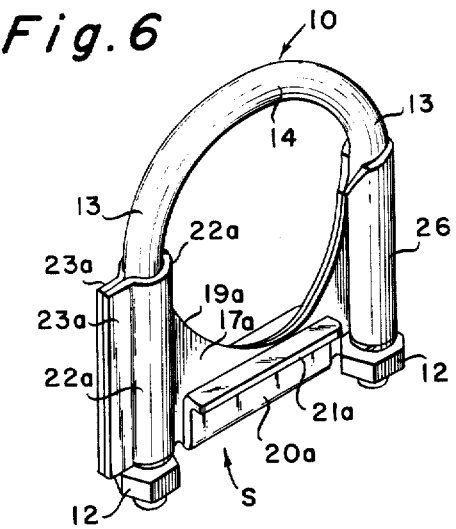
FIG. 6 is a perspective view of an alternative embodiment of the invention.
Figure 7:
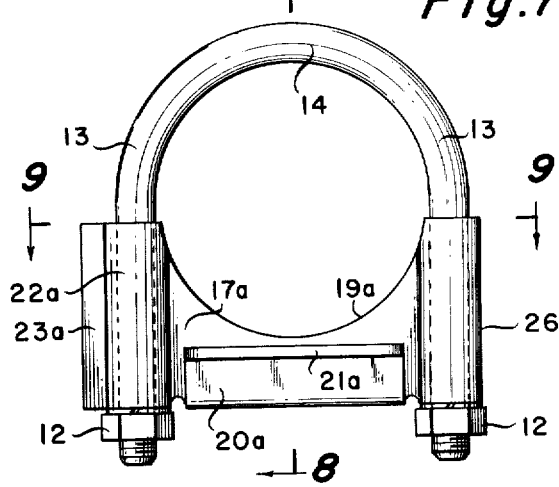
FIG. 7 is a side elevation thereof.
Figure 8:
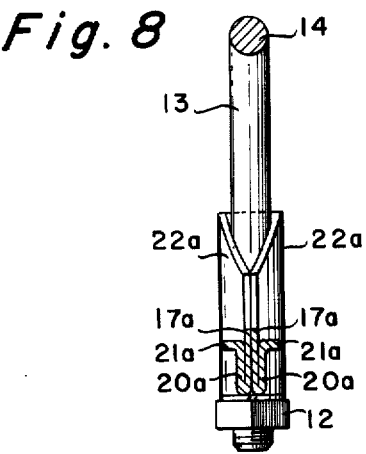
FIG. 8 is a sectional view on line 8—8 of FIG. 7.

In the preferred form of the invention, illustrated in FIGS. 1 - 5, the body of the saddle S is constituted of a pair of identical blanks A and B having the initial configuration shown in FIG. 5 with a central web portion 17 and intermediate opposite end sections 18 whose top and bottom ends are parallel to each other and to the longitudinal axis of the blank. The bottom end faces of the sections 18 lie in a plane common thereto and which defines the bottom edge of the saddle when the blank is processed to its final form. The top edge of the blank is formed with a semi-circular recess 19 curved on the radius of the semicircular bight of a U-bolt on which the saddle is to be mounted in service. This recess terminates at its ends in the plane common to the top ends of the sections 18. In the initial planar form of the blank the bottom edge portion of the central web 17 is extended downwardly in the plane of the web to provide a reinforcement tab 20 which is doubled upwardly and flatly against the central portion of the web 17 over substantially its entire length between the bottom ends of the section 18. At its upper edge the reinforcement tab is disposed in a straight line parallel to the longitudinal axis of the blank and distally spaced slightly below the bottom of the semicircular recess 19, and the entire edge portion is formed with an outwardly turned lateral flange or lip 21, as best shown in FIG. 3. This flange 21 extends at a right angle to adjacent planar face of the central web 17 and greatly reinforces both the web and the tab 20 against distortion and roll over when under the force generated by high level torque incident to tightening of a clamp in which the saddle is employed in service.

Each end section 18 of the saddle blank is stamped to form a semicircular offset portion 22 extending from top to bottom of its section on an axis normal to the longitudinal axis of the blank. These offsets 22 extend from the same side of the blank as the tab 20 and are located intermediate the ends of the tab and the outer end edges of the blank, leaving a flat lip 23 between the semicircular portion 22 and the adjacent end edge of the blank. The body of the saddle is constituted of two such identically formed blanks welded together by spot welds in coincident parallel relation, with their offset portions 22 in registry and thereby forming a pair of cyindrical tubular housings for receiving in axially slidable relation the legs 13 of a U-bolt on which the saddle is mounted. The interface plane of the two blanks is common to the interface of the end lips 23 and bisects the cylindrical tubular housings formed by registry of the semicircular offsets 22.

Figure 9:
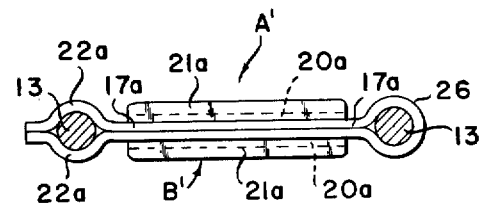
FIG. 9 is a sectional view on line 9—9 of FIG. 7.
Figure 10:
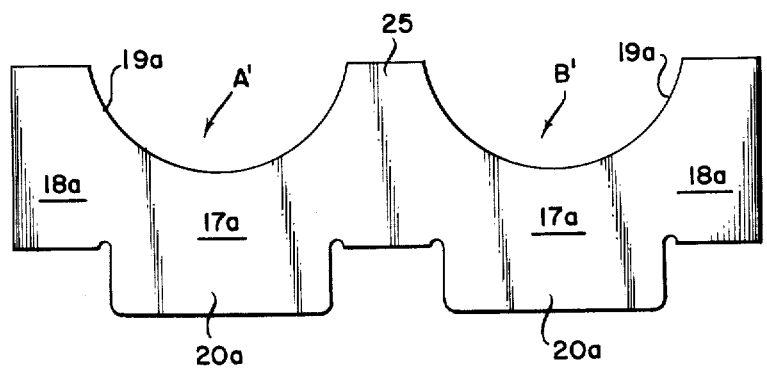
FIG. 10 is a plan view of the blank from which the saddle of FIG. 7 is formed.

The alternative embodiment of the clamp saddle illustrated in FIGS. 6 – 10 is formed from an initially planar, oblong blank of the same sheet steel from which the blank of the preferred form is made, but in the configuration shown in FIG. 10; it is, in fact, an integral end to end combination of two blanks of the configuration of the blank of FIG. 5.

With reference to FIG. 10, it will be seen that the blank comprising the saddle S is formed with a middle portion 25, two side portions A and B, web portions 17a connecting opposite end sections 18a with the middle portion 25, and reinforcement tabs 20a extending from the web portions 17a. The top edges of the web portions 17a are formed with semicircular recesses 19a which terminate at their ends in the plane common to the top ends of the end sections 18a and the middle portion 25. As in the preferred embodiment, the reinforcement tabs 20a are doubled upwardly and flatly against the web portions 17a and with their top edges disposed in a straight line parallel to the longitudinal axis of the blank and distally spaced slightly below the bottoms of the recesses 19a. Also as in the preferred form, the entire top edge portions of the tabs 20a are formed with laterally outturned flanges or lips 21a which extend at a right angle to the adjacent planar faces of the web portions 17a, and like their counterparts 21 in the preferred embodiment, greatly reinforce the webs and tabs against distortion and roll over.

Each end section 18a of the saddle blank is stamped to form a semicylindrical offset 22a extending from top to bottom of its section on an axis normal to the longitudinal axis of the blank and, as in the preferred embodiment, they extend laterally from the same side of the blank as the tabs 20, leaving a flat lip 23a between the offset 22a and the adjacent end edge of the blank.

When the blank is shaped to final form the middle portion 25 is rolled to form a cylindrical tubular housing 26 for encompassing in axially slidable relation one leg 13 of a U-bolt on which the saddle is to be mounted in service. The body of the blank is folded flatly back upon itself, pivoting on the axis of the housing 26, to bring the open faces of the semicylindrical offsets 22a in registry and thereby form a cylindrical tubular housing for receiving in axially slidable relation the other leg 13 of the U-bolt. This folding of the blank provides the body of the saddle with the two identical and coincident side portions A' and B' as best seen in FIG. 9. These side portions and lips 23a are in full face contact over the entire area of their inner faces on an interface plane that bisects the cylindrical housings formed by the offsets 22a and the housing 26. The completed saddle, like the saddle of the preferred embodiment, has the same arrangement of four thicknesses of sheet steel over the major extent of its web area between the bolt leg housings, giving a total thickness of .356 inch through the web/tab area.

OPERATION

In both embodiments of the invention, when the saddle is mounted on the legs of a U-bolt with a telecoped coupling of two pieces of metal tubing disposed between the semicircular recess in the top edge of the saddle web and the bight of a U-bolt, the clamp is tightened by drawing up rotation of the securing nuts to advance the saddle axially along the bolt legs to compress the coupling and indent a circular bead therein and provide a fluid tight seal over the full 360° of the joint. The greater the total thickness of a telescoped coupling, the higher will be the torque required to draw up the securing nuts so that the clamp will indent a fully leak proof bead in the coupling.

I have found that the saddles employed in clamps of the general types of the patents hereinbefore noted are incapable of withstanding high torque levels of 50 ft./lbs. or higher, because at such levels the saddle webs begin to twist laterally and roll over at their junctions with the bolt leg housings. At that point further tightening is impossible. The tendency to twist and roll has always been a problem in the industry which heretofore has sought to solve the problem by using thicker and heavier sheet metal for the saddle webs and by welding together a pair of parallel web sections with or without a spacer plate in between, thus increasing the saddle thickness over the web area. Such expedients have not provided a satisfactory solution of the problem. The saddle webs lack adequate reinforcement to prevent collapse at nut torquing levels above 40 foot lbs. Clamp saddles of the present invention will withstand 80 foot pounds of torque on each nut, giving an increase of 100% in clamping ability. This is a very substantial advance in the art and is made possible by the stabilizing effect of the longitudinal reinforcement provided by the outturned tab flanges 21 and 21a. These flanges are unique and do not exist in the prior art.

I claim:

1. A U-bolt clamp saddle body comprising a pair of identical oblong planar sheet metal work engageable webs welded together in parallel full face contact, a U-bolt leg receiving portion at each end of each web integral therewith, each web having an edge portion doubled back upon itself in full planar face contact with the outer face of its web and terminating in a laterally out-turned flange extending for substantially the entire length of the web intermediate said U-bolt leg receiving portions and parallel to the longitudinal axis of the web, both said flanges being in a common plane and normal to the plane of interface contact between the inner faces of the webs, the upper edge of each web defining a work engaging edge portion, said flanges being disposed below said edge portions.

2. In the clamp saddle of claim 1, both of said U bolt leg receiving portions being lateral offsets semicircular in cross section and extending laterally from their associated webs on the same side as the doubled back portions.

3. In the clamp saddle of claim 1, one of said U bolt leg receiving portions being a bight in the form of a tube circular in cross section and integral with the body of the saddle.

* * * * *